May 8, 1928.

H. L. WATSON 1,669,362

FILTER PLATE

Filed Jan. 31, 1924

Inventor,
Harold L. Watson,
by
His Attorney.

Patented May 8, 1928.

1,669,362

UNITED STATES PATENT OFFICE.

HAROLD L. WATSON, OF LYNN, MASSACHUSETTS, ASSIGNOR TO GENERAL ELECTRIC COMPANY, A CORPORATION OF NEW YORK.

FILTER PLATE.

Application filed January 31, 1924. Serial No. 689,825.

The present invention comprises a new filtering medium which is mechanically strong, resistant to the action of chemicals and possesses a degree of porosity adapted for the rapid filtering of liquids and gases. This new filtering medium is constituted essentially by particles of porous silica cemented to one another by incipient fusion.

When silica has been employed for the manufacture of filter plates, the particles of silica have been cemented together by a binder of glass. For some purposes the glass binder is undesirable as it is soluble in some of the media to be filtered. It also reduces the porosity of the mass.

I have discovered that by careful heating, substantially pure silica may be fritted together without the use of a binder to form strong, coherent plates or other desired filtering bodies. My invention includes both a new silica product and the process of making such product.

Figure 1:
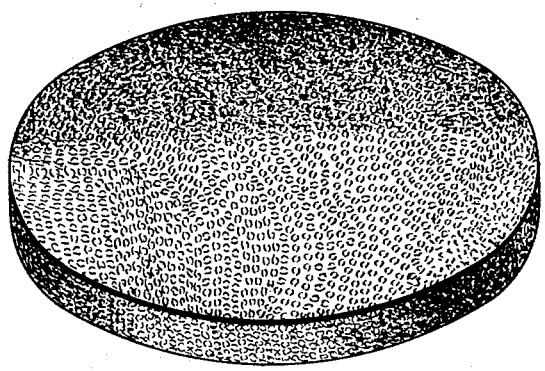
Figure 2:
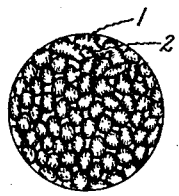

The accompanying drawing shows in Fig. 1 in perspective a filter plate of silica which embodies my invention; and Fig. 2 shows an enlargement of a section of the surface of the material.

In carrying out my invention, substantially pure sand, crushed quartz or other suitable form of silica is formed to desired shape in a mold of carbon, or other suitable refractory material which is inert with respect to silica. Fig. 1 shows a disc or plate filter but other forms may be used. I prefer to use particles passing a screen of about 40 mesh and retained by a screen of 60 mesh. The mass of silica is heated while in said mold to a temperature of about 1700 degrees centigrade in an electric resistance furnace or other suitable heating means. The heating temperature should be high enough to cause conversion of the silica if crystalline to the glassy state and the adhesion or fritting of the silica particles to each other, but not so high as to cause such coalescence and glazing of the quartz as would substantially reduce the porosity of the mass.

When a mass of quartz which has been heated to about 1700 degrees centigrade is taken from the furnace while still heated to a temperature of about 200 degrees centigrade, the surface of the quartz has a grayish, glassy appearance. Upon cooling down to about 100 degrees centigrade, a change in physical structure may be seen taking place in the quartz, the exterior surface becomes white and "frosty" looking, as though a checking or cracking of the quartz or conversion to a less vitreous condition were taking place.

As shown in magnified form in Fig. 2, the product consists of grains 1 fritted together by incipient fusion at their edges, leaving cavities 2 between the grains. The silica particles have the appearance of having become intumescent and exploded somewhat like puffed grain. They are weak and friable mechanically.

The product is a strong, coherent mass having a mass density materially lower than that of silica and being sufficiently porous to permit liquids and gases to rapidly flow therethrough.

Various corrosive liquids may be filtered by this new product without chemical attack, even hot concentrated alkalies may be filtered without appreciable attack of the silica.

What I claim as new and desire to secure by Letters Patent of the United States, is:

1. A cellular body comprising particles of silica adhering to one another in the absence of a binder, said particles being individually expanded into an intumescent condition resembling puffed grain.

2. A filter for liquids and gases constituted of intumescent silica particles adhering to one another by incipient fusion in the absence of a binder, said filter having materially lower mass density than ordinary silica.

3. The method of making a porous, silica body which consists in heating a mass of silica particles to a temperature at which adhesion occurs without complete fusion and then cooling before coalescence and glazing of said mass has occurred.

4. The method of making a filtering medium which consists in heating to about 1700° C. quartz particles capable of passing through a 40 mesh screen but being retained by a 60 mesh screen, thereby producing intumescence of said particles and adhesion to one another without complete fusion.

In witness whereof, I have hereunto set my hand this 26th day of January, 1924.

HAROLD L. WATSON.